US006997472B2

(12) United States Patent
Reutlinger et al.

(10) Patent No.: US 6,997,472 B2
(45) Date of Patent: Feb. 14, 2006

(54) TRAILER TOWING DEVICE

(75) Inventors: Peter Reutlinger, Bretten (DE);
Eberhard Palmer, Vaihingen (DE);
Andreas Piede, Illingen (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 200 days.

(21) Appl. No.: 10/617,359

(22) Filed: Jul. 11, 2003

(65) Prior Publication Data
US 2005/0046148 A1 Mar. 3, 2005

(30) Foreign Application Priority Data
Jul. 11, 2002 (DE) ................. 102 31 223

(51) Int. Cl.
B60D 1/54 (2006.01)
(52) U.S. Cl. ................. 280/491.3; 280/491.1; 280/420
(58) Field of Classification Search ............ 280/491.1, 280/491.3, 491.5, 478.1, 479.1, 488, 501, 280/507, 420
See application file for complete search history.

(56) References Cited

U.S. PATENT DOCUMENTS

| 2,547,299 A | * | 4/1951 | Williams ................. 280/491.3 |
| 4,078,827 A | * | 3/1978 | Pilhall .................... 280/491.3 |
| 4,923,205 A | * | 5/1990 | Durm ..................... 280/491.3 |
| 5,964,475 A | * | 10/1999 | Gentner et al. ............ 280/420 |
| 6,786,500 B2 | * | 9/2004 | Kleb et al. ............... 280/491.1 |
| 2002/0020988 A1 | * | 2/2002 | Kleb et al. ................. 280/507 |

FOREIGN PATENT DOCUMENTS

| DE | 3833471 A1 | 1/1990 |
| DE | 4142317 A1 | 6/1993 |
| DE | 20016618 | 1/2001 |
| DE | 10004523 | 8/2001 |
| DE | 10023640 A1 | * 11/2001 |
| DE | 10023641 A1 | * 11/2001 |
| EP | 0491241 A1 | 6/1992 |
| EP | 1225067 | 1/2002 |

OTHER PUBLICATIONS

European Search Report mailed Sep. 30, 2003.

* cited by examiner

Primary Examiner—Lesley D. Morris
Assistant Examiner—Daniel Yeagley
(74) Attorney, Agent, or Firm—Crowell & Moring LLP

(57) ABSTRACT

A trailer towing device can be swivelled from an operative position into an inoperative position and back. During an adjusting from the operative position into the inoperative position, a socket for an electrical plug device of a trailer is continuously taken along. The coupling neck of the trailer towing device as well as the socket are covered in the vehicle in their inoperative position.

3 Claims, 3 Drawing Sheets

TRAILER TOWING DEVICE

BACKGROUND OF THE INVENTION

The present invention relates to a trailer towing device for motor vehicles, and more particularly, to a device having a coupling neck which can be adjusted on the vehicle body between an inoperative position and an operative position and has a coupling ball at the end side and, at the vehicle body or a member, an adjustably held socket is provided for an electric plug connection of a trailer.

DE 200 16 618 US discloses a socket for an electrical plug connection on a towing device which can be adjusted along with the adjusting of a coupling rod between an inoperative position and an operative position.

SUMMARY OF THE INVENTION

An object of the present invention is to provide an improved socket which can be swung in, on a trailer towing device, and which can be moved in a simple manner into and from an inoperative position and an operative position so as to ensure a secure and covered arrangement on the rearward end of the vehicle.

This object has been achieved in a trailer towing device by providing that the socket is disposed on the vehicle body in a resiliently prestressed manner and, as a function of the adjusting movement of the coupling neck, can be adjusted by it, while being taken along, into a moved-out operative position and into a moved-in inoperative position.

Among principal advantages achieved with the invention are that, with the adjustment of the coupling neck of the trailer towing device, the socket is simultaneously taken along without any auxiliary devices, and the coupling neck and the socket can jointly take up a covered inoperative position at the vehicle.

For the foregoing purpose, the socket is disposed in a spring-mounted prestressed manner on the vehicle body or on a member and, as a function of the adjusting movement of the coupling neck, can be adjusted thereby, while being taken along, into a moved-out operative position and into a moved-in inoperative position and back again. In particular, the socket is swivelled by a pivot pin held on the member side about a horizontal axis in the vertical direction, such that, in the operating position, the socket is held by a spring element arranged on the pivot pin in an end position, and the spring element is supported by its one end, on one hand, on the member side and, by its other end which faces away, on the other hand, on a finger-type stop part of a bearing plate of the socket.

As a result of this swivellable bearing of the socket and the course of the movement of the coupling neck from the operative position into the inoperative position, a continuous taking-along of the socket corresponding to the movement of the coupling neck of the trailer towing device can be achieved in a simple manner. The socket is subjected to the tension of the spring element and, when the coupling neck is adjusted into the inoperative position, places itself tightly against the latter and, after the taking-up, in the operative position can hold itself in a moved-out end position.

According to the invention, for this purpose, the stop part is provided and extends away from the bearing plate and, in the end position, reaches below a leg of the member connected with the vehicle body. By way of this stop part, the socket is stationarily supported on the member while under the tension of the spring element.

So that a continuous swivelling of the socket becomes possible in a simple manner when the individual positions of the coupling neck are taken up and special auxiliary devices, such as motors, control elements, cables and similar devices, are avoided, it is advantageously provided according to the invention that the coupling neck in the member can be swivelled about a vertical axis from the operative position into at least one intermediate position below the socket situated in the end position. For taking up the inoperative position, the coupling neck is constructed to then swivel about a horizontal axis in the member, and an interior surface of the coupling neck is situated opposite the socket which, during a further swivelling movement, reaches under the coupling neck while resting there against and carries it along into the inoperative position against the tension of the spring element.

So that the inoperative position of the coupling neck and of the socket can be taken up, the socket, in the end position, is arranged below the member having two spaced legs and, in the inoperative position, can be swivelled between the legs into a clearance. During the adjustment of the coupling neck from the inoperative position back into the operative position, the coupling neck carries the socket resting upon it, and in the operative position of the coupling neck, the socket is arranged to be spaced away to a certain extent. Connecting devices between the socket and the coupling neck are not provided.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
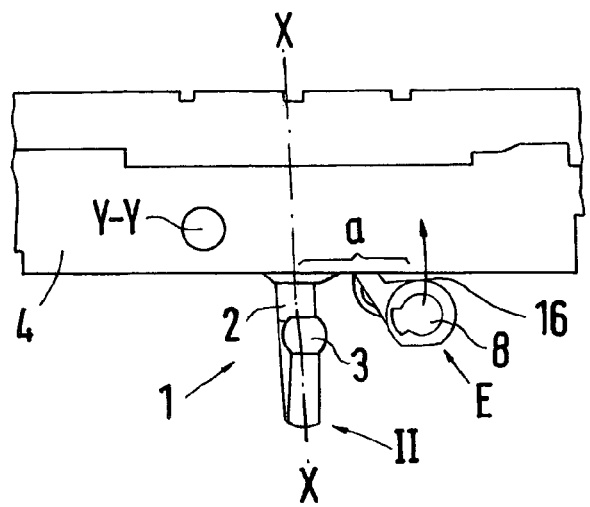
FIG. 1 is a view of a trailer coupling device with a position of a coupling neck and a socket in a moved-out operating position.
Figure 2:
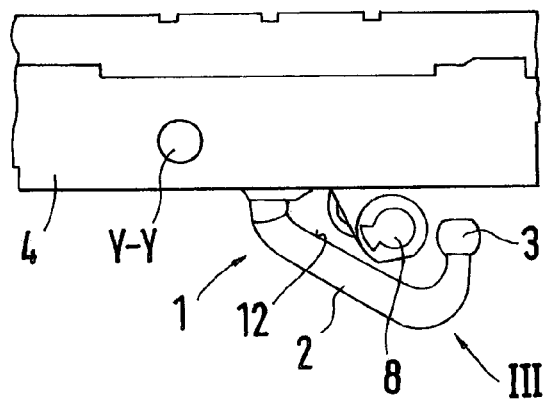
FIG. 2 is a view of the trailer coupling device shown in FIG. 1 but in a possible intermediate position of the coupling neck swivelled in toward the side.
Figure 4:
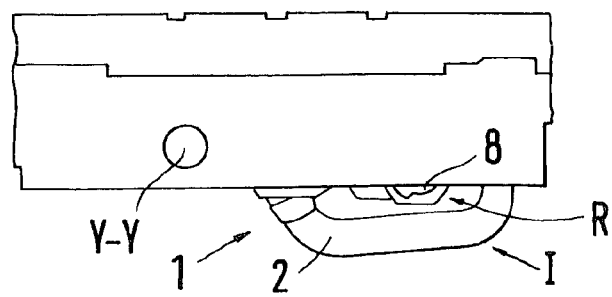
FIG. 4 is a view of the trailer coupling device shown in FIGS. 1–3 but in an inoperative position of the coupling neck.
Figure 5:
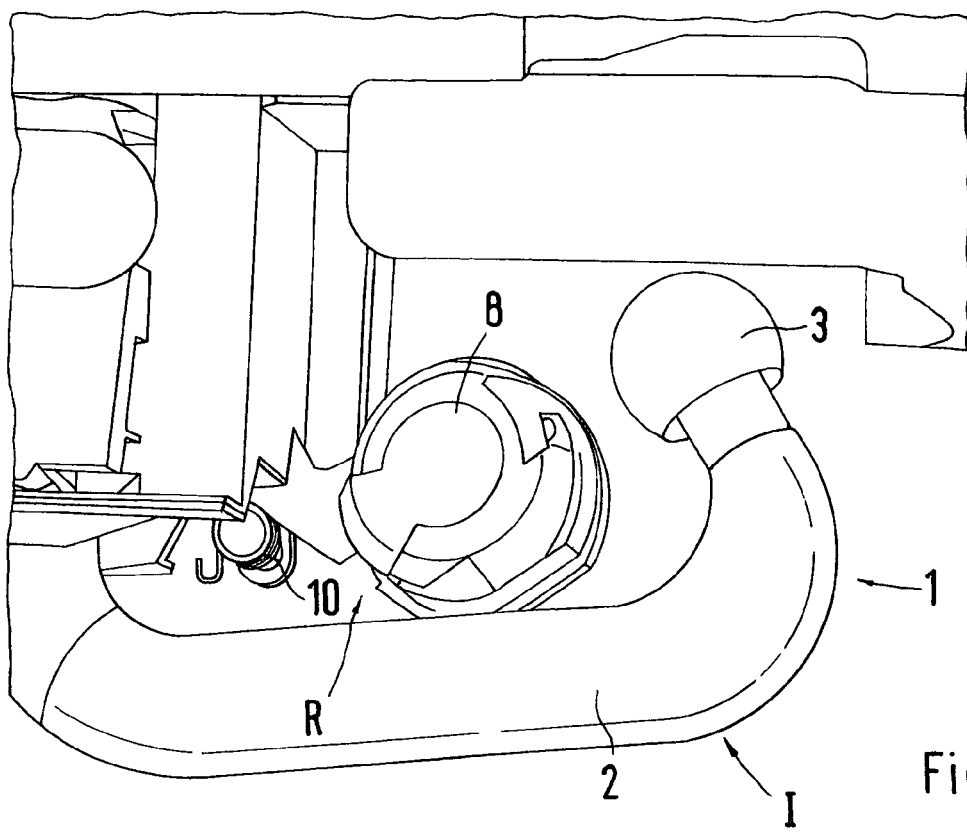
FIG. 5 is an enlarged perspective view of the coupling neck with a carried socket in an inoperative position.
Figure 6:
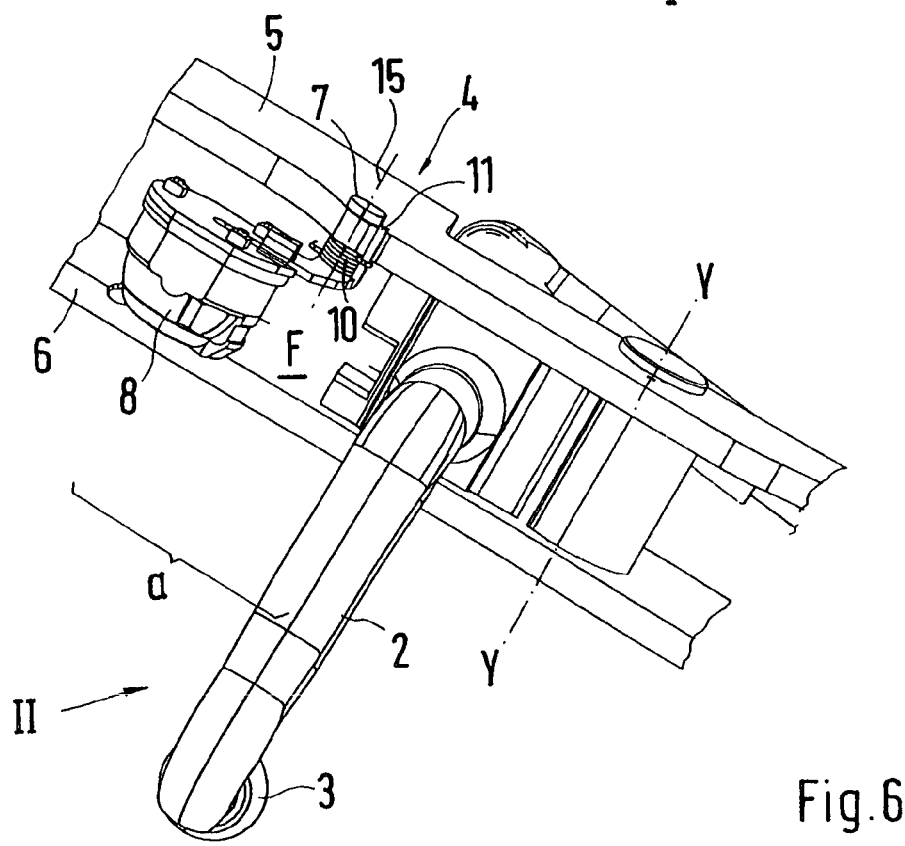
FIG. 6 is a perspective view of the trailer towing device as viewed from below the coupling neck with the socket in the operative position.

The trailer coupling device designated generally by numeral 1 essentially comprises a coupling neck 2 which can be adjusted about a vertical axis and a horizontal axis, X-X and Y-Y, into an operative position II (FIG. 1) and an inoperative position I (FIG. 4) and back and which carries a coupling ball 3 on the end side. The coupling neck 2 is adjustable in a member 4 by way of an adjusting device (not shown in detail) about these X-X and Y-Y axis, which member 4 can be fastened to the vehicle body and has a clearance F between two legs 5, 6. Furthermore, a socket 8 is swivellable in the vertical direction (the direction of the arrow 16 in FIG. 1) held at least on the leg 5 of the member 4 by means of a pivot pin 7. In particular, the socket 8 is arranged at a distance from the coupling neck 2 so that the latter can reach under the socket 8 during the adjusting operation.

As illustrated in detail in FIGS. 1 to 4, the coupling neck 2 can be swivelled from the operative position II by way of, for example, the illustrated intermediate positions III and IV into the inoperative position I and back. In this case, the coupling neck 2 reaches under the socket 8 and takes it along. The socket can, therefore, corresponding to the adjusting course of the coupling neck 3, be swivelled along from the moved-out end position E in FIG. 1 into the moved-in inoperative position R in FIG. 4 and back.

Figure 7:
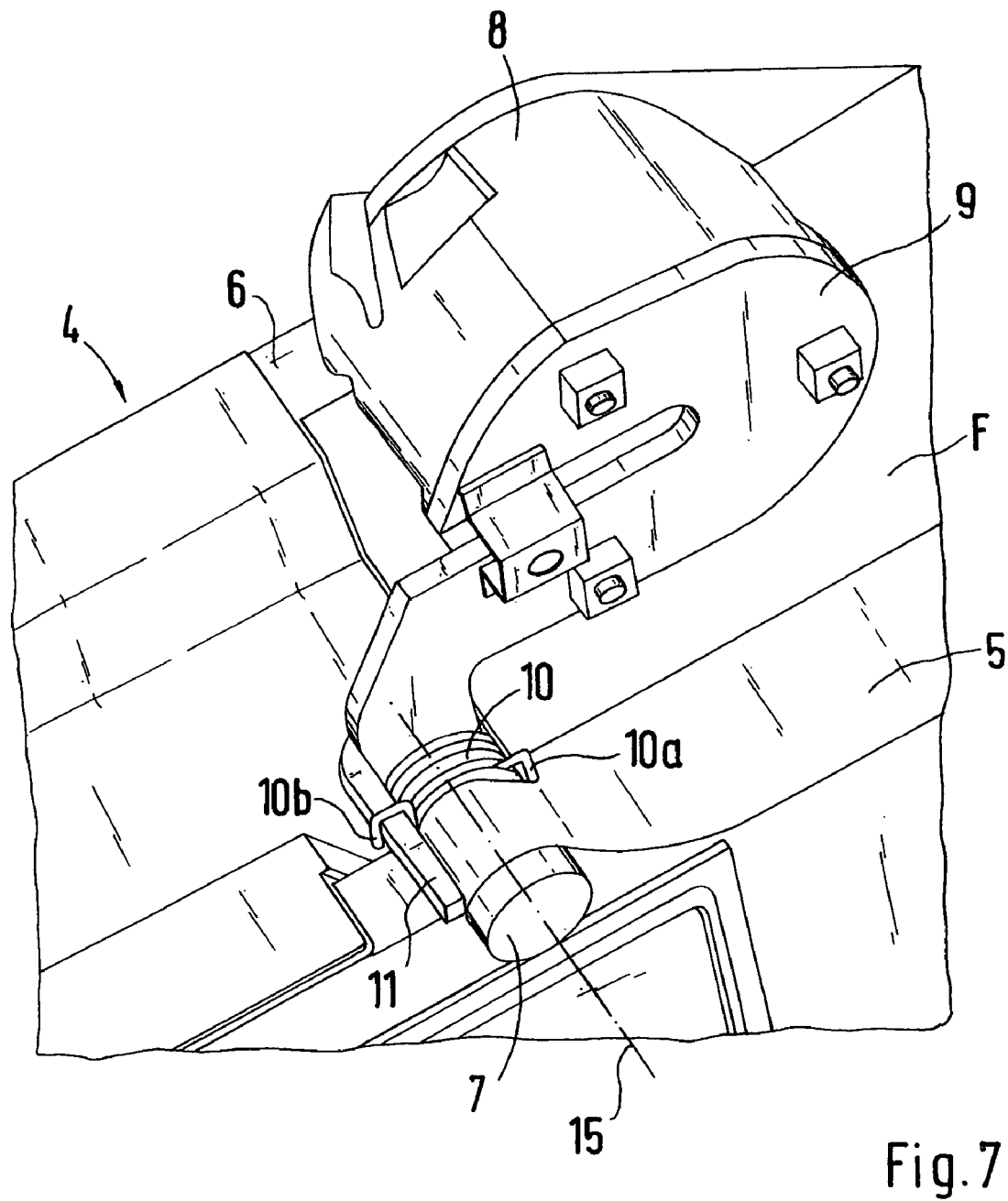
FIG. 7 is an enlarged perspective view of the socket with the bearing plate, the pivot pin and the stop part viewed from below.

The socket 8 is connected with a bearing plate 9 which, in turn, is fastened to the pivot pin 7 as seen in FIG. 7. By way of an intermediately connected spring element 10, the socket 8 is held in the moved-out end position E in a supported manner by way of a finger-type stop part 11 (FIG. 7) projecting from the bearing plate 9 on the leg 5 of the member 5 under the tension of the spring element 10. During an adjusting operation of the coupling neck 2 about the axis X-X from the operative position II into the first intermediate position III, the coupling neck 2 approaches the socket 8 such that an inner neck surface 12 is situated opposite the socket 8 from below.

Figure 3:
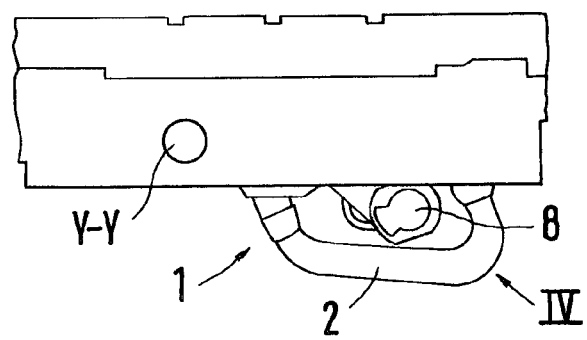
FIG. 3 is a view of the trailer coupling device shown in FIGS. 1 and 2 but in a swivelled-up intermediate position of the coupling neck.

As illustrated in detail in FIG. 3 in the intermediate position IV, the coupling neck 2 is swivelled about the horizontal axis Y-Y. During this operation, the neck surface 12 reaches directly under and is in direct contact with the socket 8. In this intermediate position IV, the socket 8 rests on the neck surface 12 under the tension of the spring element 10. After a further swivelling of the coupling neck 2 about the vertical axis Y-Y, according to FIG. 4, the coupling neck 2 takes up its inoperative position I and the socket takes up its inoperative position R.

In positions I and R, a portion of the coupling neck 2 and the socket 8 are arranged in the clearance F between the legs 5, 6 of the member 4. Because the member 4 is also covered by a body rear structure panel, the trailer towing device 1 is no longer visible from the outside.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Trailer towing device for a motor vehicle, comprising a coupling neck configured to be adjustable on a vehicle body between an inoperative position and an operative position and having a coupling ball at an end side thereof and, at the vehicle body or a member, an adjustably held socket for an electric plug connection of a trailer,
   wherein the socket is arranged on the vehicle body in a resiliently prestressed manner such that the adjustable movement of the coupling neck adjusts the socket and takes the socket along to and from a moved-out operative position and a moved-in inoperative position,
   wherein a pivot pin on a side of the vehicle body or member is provided to swivel the socket about a horizontal axis in a vertical direction,
   a spring element arranged on the pivot pin holds the socket, in the operative position, in an end position and the spring element is supported at one end thereof on a side of the member and at another end thereof, which faces away on a finger-shaped stop part of a bearing plate of the socket, and the coupling neck in the member is swivelable about a vertical axis from the operative position into an intermediate position below the socket situated in the end position, and, for taking up the inoperative position, the coupling neck is configured to be swivelable about a horizontal axis in the member, and wherein an interior surface of the coupling neck is situated opposite the socket which, during a further swiveling movement, extends under the coupling neck while resting thereagainst and takes the socket along into the inoperative position against tension of the spring element.

2. Device according to claim 1, wherein, in the end position, the socket is arranged below the member having two spaced legs and, in the inoperative position, is swivelable between the legs into a clearance.

3. Device according to claim 2, wherein, in an inoperative position of the socket, the socket, while being tensioned by the spring element, is arranged on the coupling neck between the legs in the clearance.

* * * * *